United States Patent [19]

Anzai et al.

[11] Patent Number: 4,516,664

[45] Date of Patent: May 14, 1985

[54] APPARATUS FOR CONTROLLING AN A-C POWERED ELEVATOR

[75] Inventors: Nobuo Anzai; Hiroyuki Ikejima, both of Inazawa, Japan

[73] Assignee: Mitsubishi Denki Kabushiki Kaisha, Japan

[21] Appl. No.: 473,723

[22] Filed: Mar. 9, 1983

[30] Foreign Application Priority Data

Apr. 30, 1982 [JP] Japan .................................. 57-72928

[51] Int. Cl.$^3$ ................................................ B66B 5/02
[52] U.S. Cl. ................................ 187/29 R; 318/801;
318/807; 363/97; 363/98; 363/131
[58] Field of Search ................ 187/29, 29 R; 307/64;
363/37, 79, 97, 98, 131–134; 318/800–807, 701,
798, 799

[56] References Cited

U.S. PATENT DOCUMENTS

| 3,331,003 | 7/1967 | King ................................. 318/798 |
| 3,800,199 | 3/1974 | Weigand .......................... 318/701 |
| 3,813,589 | 5/1974 | Boice ............................... 318/798 |
| 4,054,943 | 10/1977 | Mundt ............................. 318/701 |
| 4,227,138 | 10/1980 | Espelage et al. ............. 318/807 X |
| 4,269,286 | 5/1981 | Ishii et al. ..................... 187/29 R |
| 4,271,931 | 6/1981 | Watanabe ....................... 187/29 R |
| 4,315,203 | 2/1982 | Ibamoto et al. ............. 318/799 X |
| 4,330,817 | 5/1982 | Avar et al. ................... 318/801 X |
| 4,437,050 | 3/1984 | Overzet ......................... 318/807 X |

FOREIGN PATENT DOCUMENTS

| 56-132275 | 10/1981 | Japan. |
| 1364752A | 8/1974 | United Kingdom. |
| 1397132A | 6/1975 | United Kingdom. |
| 1413704A | 11/1975 | United Kingdom. |
| 2106342 | 4/1983 | United Kingdom ............. 187/29 R |

Primary Examiner—Stanley J. Witkowski
Assistant Examiner—Paul Shik Luen Ip
Attorney, Agent, or Firm—Leydig, Voit, Osann, Mayer and Holt, Ltd.

[57] ABSTRACT

An apparatus for controlling an A-C powered elevator wherein: when a frequency instruction value lies within a predetermined frequency range, an inverter in the apparatus produces an A-C electric power having a frequency which lies outside said predetermined frequency range, so that the frequency of the electrical power supplied from said inverter to the motor driving an elevator cage will be out of the resonant frequency range of the mechanical system of the elevator. Namely, an inverter is connected to a D-C power supply, the inverter is controlled by a voltage instruction value and a frequency instruction value, a D-C electric power is converted into the A-C electric power having a variable voltage and a variable frequency by said inverter, and an A-C electric motor is powered by the thus converted A-C electric power to drive an elevator cage, wherein a frequency conversion computer is provided which, when said frequency instruction value lies within a predetermined frequency range, sends to said inverter a frequency instruction value which lies outside said frequency range.

6 Claims, 8 Drawing Figures

APPARATUS FOR CONTROLLING AN A-C POWERED ELEVATOR

BACKGROUND OF THE INVENTION

1. Field of the Invention

The present invention relates to an improved apparatus for controlling an elevator that is driven by an A-C motor.

2. Description of the Prior Art

An induction motor is often used to drive the cage of an elevator. In this case, A-C power having a variable voltage and a variable frequency obtained through an inverter is supplied to the electric motor to control its running speed, as shown in FIG. 1.

In FIG. 1, reference numeral 1 denotes a D-C power supply, numeral 2 denotes a well known type of inverter which consists of transistors and diodes and which supplies A-C electric power of a variable voltage and a variable frequency of a pulse-width modulation system, numeral 3 denotes a three-phase induction motor which is powered by the inverter 2, numeral 4 denotes a drive sheave of a hoist which is driven by the electric motor, numeral 5 denotes a main wire wound around the sheave 4, numeral 6 denotes a cage connected to one end of the main wire 5, numeral 7 denotes a balance weight connected to the other end of the main wire 5, and numeral 8 denotes a control circuit for controlling the output voltage and output frequency of the inverter based upon a voltage instruction value Vr and a frequency instructions value Fr. Here, the voltage instruction value Vr varies nearly in proportion to the frequency instruction value Fr.

Being controlled by the control circuit 8, the inverter 2 generates an A-C electric power having a variable voltage and a variable frequency with a phase sequence that corresponds to the operation direction of the cage 6. Therefore, the motor 3 starts to run in a direction determined by the phase sequence of inputs. Thereafter, the voltage on the outputs of the inverter 2 control the running speed of the motor, thereby controlling the running speed of the cage 6.

The running speed of the cage 6 must be controlled over a wide range of speeds from the start to the stop thereof. As is well known, however, when the motor 3 is driven by the inverter 2, the motor 3 develops a torque ripple having a frequency of 6nf (where n is 1, 2, 3, . . . and f is the output frequency of the inverter 2). When the torque ripple approaches the resonance frequency of the mechanical system of the elevator (for example, the natural frequency of the main rope 5), vibration is transmitted into the cage 6 which greatly reduces the comfort of the passengers therein.

SUMMARY OF THE INVENTION

The present invention is introduced to improve the above-mentioned defect. Namely, the object of the invention is to provide an apparatus for controlling an A-C powered elevator, in which when the frequency instruction value lies within a predetermined range of frequencies, an A-C electric power having a frequency which lies outside the above-mentioned frequency range is produced by an inverter, so that the torque ripple of the electric motor will not be within the resonance frequency of the mechanical system.

BRIEF DESCRIPTION OF THE DRAWINGS

In the drawings, the same reference numerals denote the same or corresponding portions.

DESCRIPTION OF THE PREFERRED EMBODIMENT

Figure 1:
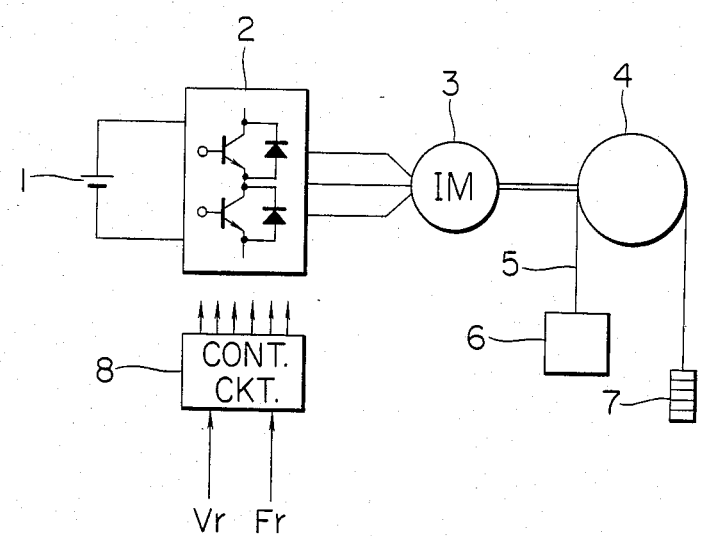
FIG. 1 is a diagram illustrating the setup of a conventional apparatus for controlling an A-C powered elevator.
Figure 2:
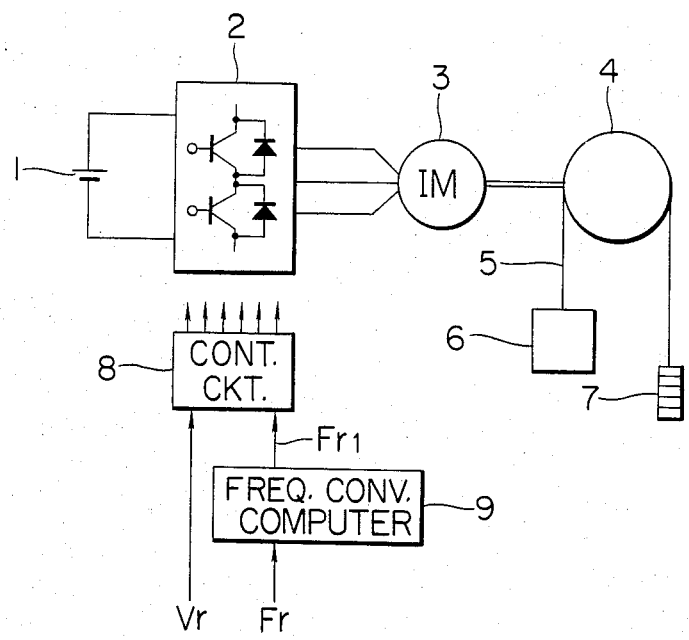
FIG. 2 is a diagram illustrating the setup of an apparatus for controlling an A-C powered elevator according to an embodiment of the present invention.

An embodiment of the invention will be described below in conjunction with FIGS. 2 and 3, in which reference numeral 9 denotes a frequency conversion computer which converts the frequency instruction value Fr into a frequency instruction value $Fr_1$ and sends it to the control circuit 8. The other portions are the same as those of FIG. 1.

Figure 3:
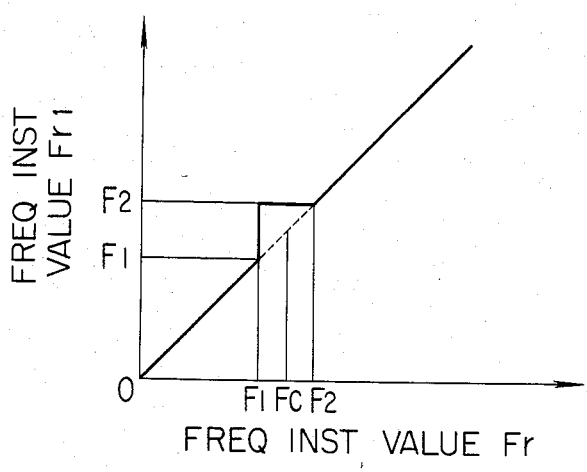
FIG. 3 is a diagram illustrating the input/output characteristics of the frequency converter circuit of FIG. 2.

FIG. 3 illustrates the relationship between the frequency instruction value Fr and the frequency instruction value $Fr_1$, wherein Fc denotes an output frequency of the inverter 2 at which the generated torque ripple is at the resonant frequency of the mechanical system of the elevator. The frequency Fc lies between a frequency $F_1$ and a frequency $F_2$, wherein $F_1 < Fc < F_2$. In FIG. 3, the value of $Fr_1$ is as follows:

When $F_1 \leq Fr < F_2$, $Fr_1 = F_2$.

For all other cases, $Fr_1 = Fr$.

Consequently, if the frequency instruction value Fr is given, the frequency conversion computer 9 generates the frequency instruction value $Fr_1$ according to the relation of FIG. 3. Therefore, the control circuit 8 controls the inverter 2 so that it produces the output frequency $Fr_1$. Accordingly, if the frequency instruction value Fr increases and reaches $F_1$, the frequency instruction value $Fr_1$ becomes $F_2$, and the frequency instruction value $F_2$ is maintained until the value Fr reaches the valve $F_2$. Further, when the frequency instruction value Fr decreases below $F_2$, the frequency instruction value $Fr_1$ is held at $F_2$ until the frequency instruction value Fr becomes $F_1$, at which time, the frequency instruction value $Fr_1$ changes to becomes $F_1$. Consequently, the inverter 2 does not produce the frequency Fc which causes resonance to develop in the mechanical system of the elevator. Accordingly, resonance does not occur in the mechanical system, and the comfort of the passengers in the cage 6 is maintained.

However, in the above case, if only the frequency instruction value Fr is changed, the frequency instruction value Fr goes out of phase with respect to the voltage instruction value Vr. Therefore, the motor 3 produces a sudden change in torque which affects the running of the cage 6 and similarly effects the comfort the occupants in the cage. To prevent this effect from occurring, it is desirable to provide a voltage conversion computer (not shown) in addition to the frequency conversion computer 9, in order to convert the voltage instruction value Vr into a voltage instruction value $Vr_1$ and apply it to the control circuit 8 while adjusting the output voltage of the inverter 2 simultaneously. This is explained below in conjunction with FIG. 4.

The torque produced by an induction motor is approximately given by the following equation, assuming that the slip frequency varies within a small range.

$$T = K \cdot \frac{1}{R_2} \left( \frac{V_0}{F_0} \right)^2 \cdot F_S \quad (1)$$

wherein:
$R_2$ denotes a secondary resistance converted into the primary side,
$F_0$ denotes a primary frequency,
$F_S$ denotes a slip frequency, and
$V_0$ denotes a voltage on the primary terminal.

In the above equation (1), if $V_0/F_0$ is held constant, the torque T varies in proportion to the slip frequency $F_S$.

The following description considers the control operation where $V_0/F_0$ remains constant.

First, the case where the motor 3 is being accelerated is considered. The voltage instruction value $Vr_1$ reaches the voltage $V_1$ just before the frequency instruction value $Fr_1$ reaches the frequency $F_1$, and the operating point lies at a point A on a curve 11. As the frequency given by the frequency instruction value $Fr_1$ changes from $F_1$ to $F_2$, the voltage instruction value $Vr_1$ changes from $V_1$ to $V_2$, so that the running speed vs. torque characteristics of the motor 3 are represented by a curve 12.

The torque T just before it varies is given by, $$T = K \cdot \frac{1}{R_2} \left( \frac{V_1}{F_1} \right)^2 F_S \quad (2)$$

and the torque immediately after it is varied is given by, $$T = K \cdot \frac{1}{R_2} \left( \frac{V_2}{F_2} \right)^2 \cdot \{F_S + (F_2 - F_1)\} \quad (3)$$

Since the equation (2) is equal to the equation (3), $$V_2 = \frac{F_2 V_1}{F_1} \sqrt{\frac{F_S}{F_S + (F_2 - F_1)}} ; \quad (4)$$

Figure 4:
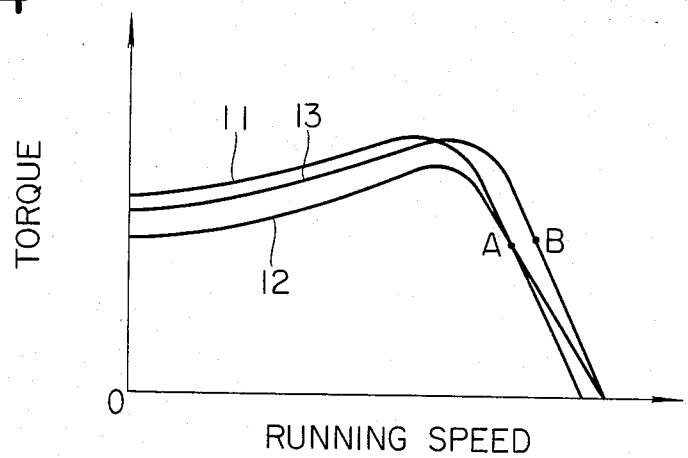
FIG. 4 is a diagram of curves which represent running speed vs. torque characteristics of the motor of FIG. 2.

The characteristics in this case are as represented by a curve 12 in FIG. 4. Since the control operation is carried out with $V_0/F_0$ being constant, the value $V_1 \cdot F_2/F_1$ of the equation (4) is equal to the voltage $V_3$ when the frequency instruction value Fr is $F_2$. That is, $$V_2 = V_3 \sqrt{\frac{F_S}{F_S + (F_2 - F_1)}} \quad (5)$$

Therefore, even when the frequency instruction value $Fr_1$ is changed, the operation point A does not change, and the torque does not change, either. Thereafter, the voltage instruction value $Vr_1$ is gradually increased from $V_2$ to $V_3$ so that the operation point moves on a line $\overline{AB}$ until the frequency instruction value Fr reaches $F_2$. Therefore, the voltage instruction value $Vr_1$ should change according to $$Vr_1 = V_3 \sqrt{\frac{F_S}{F_S + (F_2 - Fr)}} \quad (6)$$

$$= V_3 \sqrt{\frac{F_S}{F_S + \frac{1}{a} (V_3 - Vr)}}$$

wherein:
a denotes $V_0/F_0$,
Vr denotes a voltage instruction value before being varied, and
Fr denotes a frequency instruction value before being varied.

Figure 5:
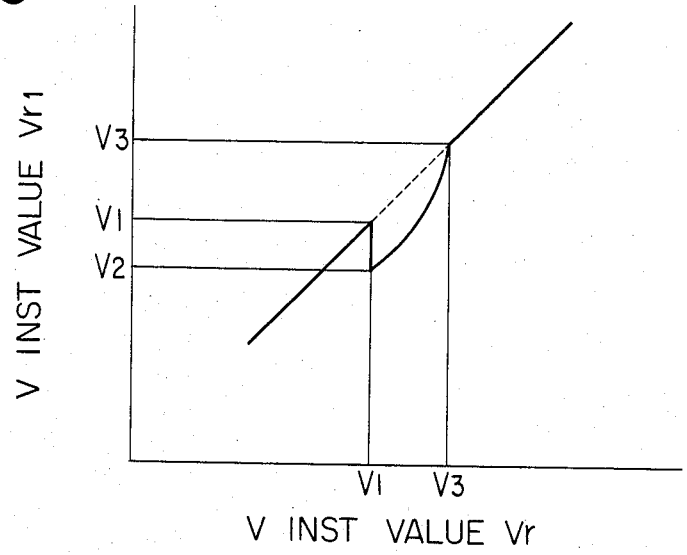
FIG. 5 is a diagram illustrating the input/output characteristics of a voltage converter circuit.

FIG. 5 shows the relation between Vr and $Vr_1$ given by the equation (6). The curve 13 of FIG. 4 represents the running speed vs. torque characteristics when the frequency instruction value $Fr_1$ is $F_2$, and the voltage instruction value $Vr_1$ is $V_3$. By adjusting the voltage simultaneously as mentioned above, it is possible to change the frequency without permitting the torque to be varied.

Figure 6:
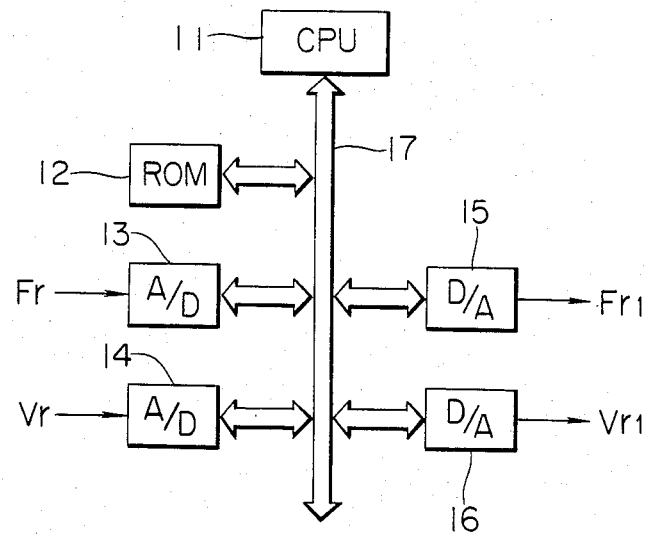
FIG. 6 is a diagram in which the frequency converter circuit and the voltage converter circuit are realized using digital circuits.

FIG. 6 is a diagram of a circuit setup for carrying out the above-mentioned control operation in a digital manner. In FIG. 6, reference numeral 11 denotes a CPU, numeral 12 denotes a function-generating ROM, numerals 13 and 14 denote A/D converters, numerals 15 and 16 denote D/A converters, and numeral 17 denotes a bus conductor of the CPU.

The frequency instruction value Fr and the voltage instruction value Vr are converted into digital quantities by the A/D converters 13, 14, and are sent to the CPU 11 which calculates the frequency instruction value $Fr_1$ shown in FIG. 3 responsive to the frequency instruction value Fr and produces an output through the D/A converter 15.

As will be obvious from the above description, the CPU 11 performs the following simple calculations:

When Fr<$F_1$, $Fr_1$=Fr

When $F_1 \leq Fr \leq F_2$, $Fr_1$=$F_2$ \quad (7)

When Fr>$F_2$, $Fr_1$=Fr

Further, when the voltage instruction is to be changed in order to prevent a sudden variation in torque, the following values are stored in the function-generating ROM 12, and a voltage instruction value $Vr_1$ corresponding to the voltage instruction Vr is read from the ROM 12, and is produced as follows:

When $Vr < V_1$, \quad $Vr_1 = Vr$ \quad (8)

-continued

Figure 7:
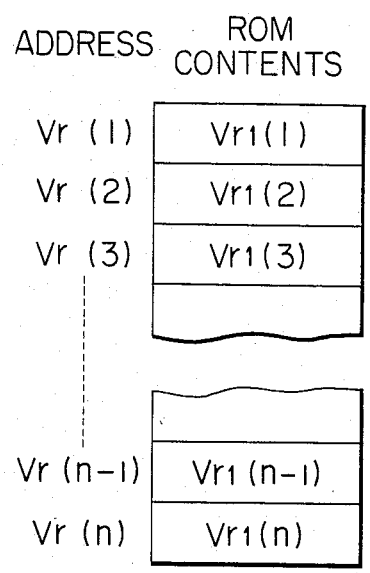
FIG. 7 is a diagram which schematically illustrates the contents recorded in a function-generating ROM of FIG. 6.

When $V_1 \leqq Vr \leqq V_3$, $Vr_1 = V_1 \dfrac{F_2}{F_1} \sqrt{\dfrac{F_S}{F_S + \dfrac{1}{a}(V_3 - Vr)}}$ When $Vr > V_3$, $Vr_1 = Vr$ That is, the voltage instruction value Vr is compared with values stored in the ROM, wherein values given by the above equation (8) are stored in a form of a Table in the ROM. This state is illustrated in FIG. 7, and a flow chart for this case is shown in FIG. 8.

Figure 8:
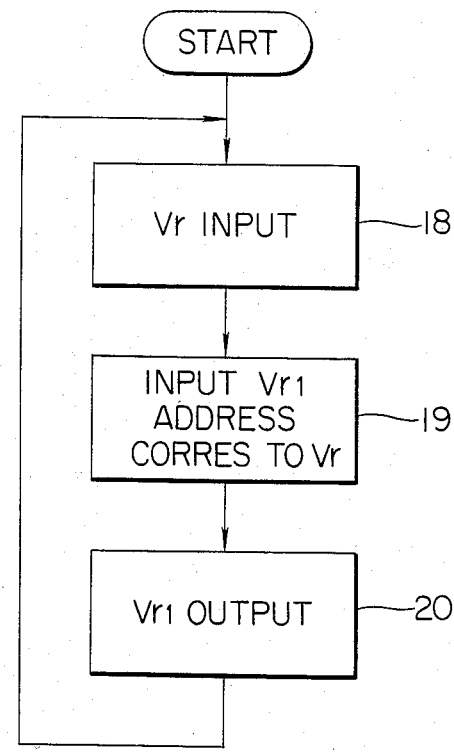
FIG. 8 is a flow chart illustrating the operation of FIG. 7.

Referring to FIG. 8, the voltage instruction value Vr is introduced in step 18 through the A/D converter 14 of FIG. 6, the contents $Vr_1$ of a corresponding address which corresponds to the voltage instruction Vr is read in step 19 from the ROM 12, and the thus read value is produced in step 20 through the D/A converter 16.

According to the present invention as described above, when a frequency instruction value for controlling the inverter lies within a predetermined frequency range, a frequency instruction value which lies outside the above-mentioned frequency range is inputed to the inverter. Therefore, resonance does not take place in the mechanical system of the elevator, and the comfort of passengers in the cage can be improved.

Further, since the voltage instruction value changes together with the change in the frequency instruction value, sudden changes in torque are eliminated by changing the value of the voltage instruction value accordingly in said predetermined frequency range.

What is claimed is:

1. An improved apparatus for controlling an AC powered elevator, the apparatus being of the type having an inverter connected to a DC power supply, the inverter being controlled by a varying voltage instruction value and a varying frequency instruction value, DC electric power being inverted by said inverter into AC electric power having a variable voltage and a variable frequency, and an AC electric motor energized by the thus inverted AC electric power so as to drive an elevator cage, wherein the improvement comprises:
   a frequency converter which, when said frequency instruction value is a frequency value within a range developing resonance in a mechanical system of the elevator, provides said inverter with a converted frequency instruction value lying outside the resonance frequency range of said mechanical system, so as to suppress resonance in said system.

2. An improved apparatus for controlling an AC powered elevator according to claim 1, wherein when the reesonance frequency range extends from a frequency $F_1$ to a frequency $F_2$ ($F_1$ $F_2$), and the frequency instruction value and the converted frequency instruction value are respectively denoted by $F_r$ and $F_{r1}$ the frequencies $F_1$ and $F_2$ being included in the frequency instruction value $F_r$, said frequency converter delivers the converted frequency instruction value of:
   $F_{r1} = F_r$ for $F_r$ $F1$,
   $F_{r1} = F_2$ for $F_11 = F_r = F_2$, or
   $F_{r1} = F_r$ for $F_2$ $F_r$.

3. An improved apparatus for controlling an A-C powered elevator according to claim 1, wherein said frequency conversion computer comprises:
   an A/D converter which converts a frequency instruction value Fr into a digital quantity,
   a CPU which, according the output value of said A/D converter, effects a predetermined calculation relative to the frequency instruction value Fr to generate a frequency instruction value $Fr_1$, and
   a D/A converter which converts the output from said CPU into an analog quantity.

4. An improved apparatus for controlling an AC powered elevator according to claim 2, wherein the frequency instruction value $F_r$ varies so as to linearly increase or decrease, and when the frequency instruction value $F_r$ approaches the range determined by the frequencies $F_1$ and $F_2$ in either direction, said frequency converter delivers the specified converted frequency instruction value.

5. An improved apparatus for controlling an A-C powered elevator according to claim 4, wherein said voltage conversion computer comprises:
   an A/D converter which converts a voltage instruction value Vr into a digital quantity,
   a ROM which stores beforehand functional values that correspond to predetermined voltage instruction values $Fr_1$,
   a CPU which reads a voltage instruction value $Vr_1$ of a corresponding address in said ROM responsive to an output of said A/D converter, and
   a D/A converter which converts said voltage instruction value $Vr_1$ into an analog quantity.

6. An improved apparatus for controlling an AC powered elevator according to claim 1, further comprising:
   a voltage converter which, when said frequency converter operates, gives said inverter a voltage instruction value corresponding to the frequency instruction value delivered by said frequency converter.

* * * * *